United States Patent [19]

Vakil et al.

[11] 4,345,915
[45] Aug. 24, 1982

[54] MIXED FEED EVAPORATOR

[75] Inventors: Himanshu B. Vakil, Schenectady; Philip G. Kosky, Ballston Lake, both of N.Y.

[73] Assignee: General Electric Company, Schenectady, N.Y.

[21] Appl. No.: 847,777

[22] Filed: Nov. 2, 1977

[51] Int. Cl.³ .............................................. C10J 3/16
[52] U.S. Cl. .................... 48/197 R; 48/202; 165/2; 165/DIG. 17; 208/142; 252/373; 423/659; 423/DIG. 6; 515/712; 585/263
[58] Field of Search ................ 48/190, 196 A, 197 R, 48/206, 210, 202; 260/449 M; 252/373; 423/DIG. 6, 659; 261/128, 152, 155; 431/11; 461/153; 165/2, DIG. 17; 208/362, 142; 585/263

[56] References Cited

U.S. PATENT DOCUMENTS

| | | | |
|---|---|---|---|
| 2,519,618 | 8/1950 | Wilson et al. | 261/152 |
| 2,560,478 | 7/1951 | Roetheli | 48/210 |
| 2,932,613 | 4/1960 | Huesler et al. | 423/659 |
| 3,183,181 | 5/1965 | Rudbach | 208/362 |
| 3,870,481 | 3/1975 | Hegarty | 48/213 |
| 3,958,625 | 5/1976 | Wentorf | 165/2 |
| 4,072,625 | 2/1978 | Pinto | 48/196 A |

FOREIGN PATENT DOCUMENTS 528338 10/1940 United Kingdom ................ 48/206

OTHER PUBLICATIONS

"Transport of Nuclear Heat by Means of Chemical Energy", Kugeler et al., Nuclear Engr. and Design, vol. 34, No. 1, pp. 65, 1975.
"One Dimensional Two-Phase Flow", Wallis, McGraw-Hill, pp. 8, 9, 316, 1969.

*Primary Examiner*—Peter F. Kratz
*Attorney, Agent, or Firm*—Leo I. MaLossi; James C. Davis, Jr.

[57] ABSTRACT

In the preparation of the gaseous reactant feed to undergo a chemical reaction requiring the presence of steam, the efficiency of overall power utilization is improved by premixing the gaseous reactant feed with water and then heating to evaporate the water in the presence of the gaseous reactant feed, the heating fluid utilized being at a temperature below the boiling point of water at the pressure in the volume where the evaporation occurs.

9 Claims, 5 Drawing Figures

4,345,915

MIXED FEED EVAPORATOR

BACKGROUND OF THE INVENTION

The invention described herein was made in the course of, or under Contract No. EY-76-C-02-2676 with the Energy Research and Development Administration.

Conventionally, in carrying out a chemical reaction in which a gaseous reactant feed and steam are required, these components are mixed with the steam already in the evaporated state.

This is typified in the arrangement shown for the process for transporting chemically bound energy described in the article "Transport of Nuclear Heat by Means of Chemical Energy" by Kugeler et al [Nuclear Engineering and Design, Volume 34, No. 1, page 65 (1975)].

U.S. Pat. No. 3,958,625 to Wentorf, Jr., dealing with the same general subject matter as the Kugeler et al article discloses the premixing of water and gaseous reactants in a heat exchanger, the water and gas mixture being heated to about 350° C. to produce a heated, pressurized gas and steam mixture for introduction into a reactor for the production of methane. Manifestly, the heating fluid utilized to perform the evaporation of the water is at a temperature far in excess of the boiling point of the water at the pressures employed.

It is the object of this invention to heat a gaseous reactant feed and a liquid in such a way as to produce a gas, vapor (i.e., the evaporated liquid) mixture utilizing a heating fluid at all times during the heat exchange at a temperature lower than the temperature required to boil the liquid at the prevailing total pressure. It is desired by this process to utilize the maximum possible amount of the heat available in the heating fluid.

A liquid is said to "boil" when it is heated to such a temperature that the vapor pressure of the liquid equals the applied pressure. Thus, at 100° C. the vapor pressure of water is one atmosphere.

DESCRIPTION OF THE INVENTION

In the preparation of the gaseous reactant feed to undergo a chemical reaction requiring the presence of a specific vapor, the efficiency of overall power utilization is improved by premixing the gaseous reactant feed with the liquid from which the specific vapor is produced and then heating the mixture with the gaseous and liquid phases in intimate contact, the heating being accomplished by using a heating fluid separate from (i.e., external to) the mixture, this fluid entering the heat exchange relationship with the mixture at a temperature below the boiling point of the liquid at the total pressure in the volume where the evaporation occurs.

In the most common application of this invention, the liquid is water.

Preferably, the evaporation is conducted in a tube and shell heat exchanger in which means are provided to distribute the loadings of liquid and gas equally to each of the heat exchanger tubes. Further, the components of the gaseous reactant feed should not be soluble to any significant extent in the liquid.

BRIEF DESCRIPTION OF THE DRAWING

The subject matter of the instant invention for which protection is sought is presented in the appended claims. The following description sets forth the manner and process of making and using the invention and the accompanying drawing forms part of the overall description for schematically illustrating the invention in the best mode.

The schematic view shown in FIG. 1 is utilized to explain the principle of this invention.

MANNER AND PROCESS OF MAKING AND USING THE INVENTION

By way of illustration, if water at 100° C. is placed in an insulated container; air, or other nonsoluble, permanent gas is introduced into the container until the total pressure within the container is 2 atmospheres, and heat is supplied to the system to maintain the water at 100° C., the water will exert a vapor pressure of essentially one atmosphere. Thus, with a total system pressure of two atmospheres, the water is contributing one atmosphere by its vapor pressure and the gas is contributing its partial pressure of one atmosphere.

If, then, air is made to flow into the same system; air and water vapor are removed from the system at the appropriate rate, and heat is added to maintain the system at 100° C., the air/steam mixture leaving the system will be in the molar ratio of the partial pressures of the air and the water. In the case illustrated, the molar ratio will be 1:1. The water, being converted into steam under a pressure of two atmospheres (total pressure), cannot boil even though it is being maintained at the temperature of 100° C., because at two atmospheres absolute the boiling point of water is above 120° C.

Figure 1:
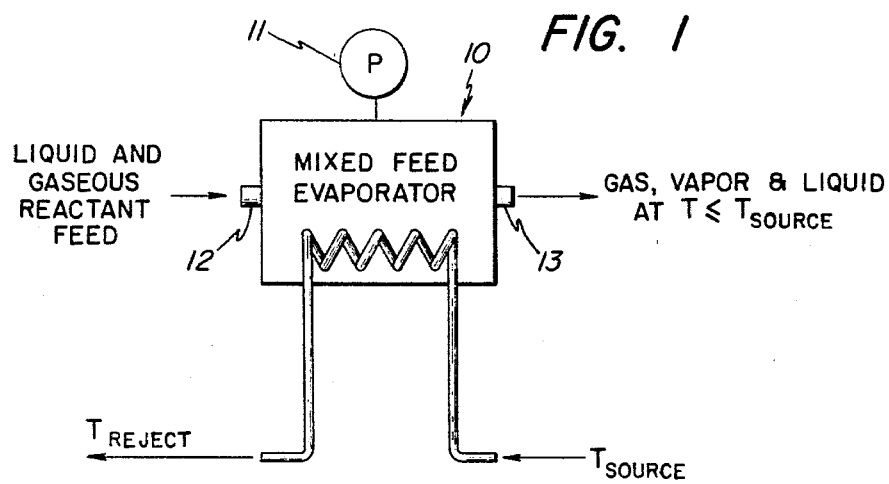

In FIG. 1 to show the overall principle of operation, the pressure in the mixed feed evaporator 10 designated by gauge 11 is such that the boiling point of the liquid in the incoming feed stream is greater than the temperature of the heating fluid ($T$ surce). As is shown, the incoming feed is a mixture of liquid and gaseous reactant feed entering via pipe 12 and the stream exiting via pipe 13 is predominately a mixture of gaseous reactant feed and vapor at a temperature equal to or less than $T$ source. The temperature of the heating fluid leaving the heat exchanger ($T$ reject) preferably is significantly lower than $T$ source.

Figure 2:
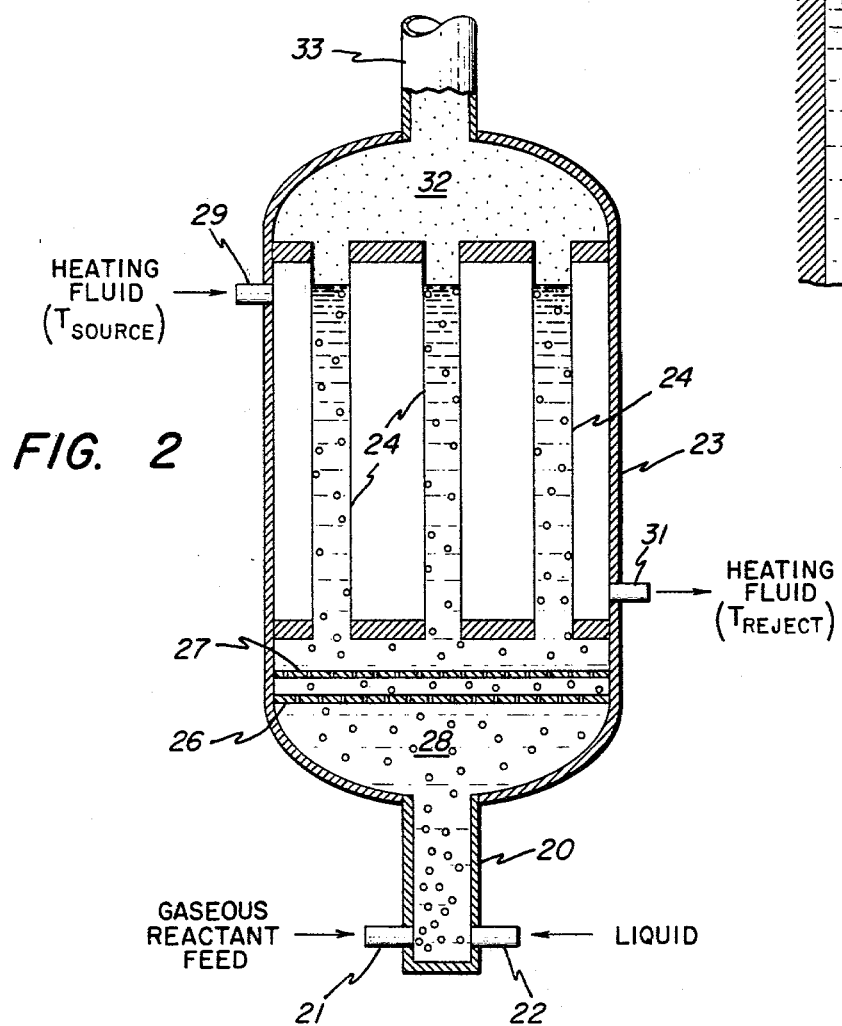
FIG. 2 is a sectional view showing a preferred apparatus for the practice of the process of this invention.

Since it is necessary to insure that the liquid and gas phases are in intimate contact during the evaporation, construction such as is shown in FIG. 2 constitutes a preferred embodiment of this invention. As shown therein, gas and liquid enter mixing section 20 via conduits 21, 22, respectively, and then pass into mixed feed evaporator 23, a tube and shell heat exchanger mounted in the vertical position, with means providing for introducing substantially the same loadings of liquid and gas into each of the tubes 24. The means for equalizing the loadings of liquid and gas are shown as a pair of spaced perforated distributor plates 26, 27 mounted in manifold region 28. The heating fluid enters via pipe 29 and flows down and around the outside of tubes 24 to finally exit via pipe 31. The mixture leaving manifold 32 at the upper end of mixed feed evaporator 23 via conduit 33 will preferably be primarily heated gaseous reactant feed and vapor, but depending upon process conditions significant or minor quantities of unevaporated liquid may also be present in the outgoing mixture (e.g. droplets entrained therein).

The successful conduct of the process of this invention will require that the liquid and gas in transit through tubes 24 will be in intimate contact during heat transfer either in the form of a homogeneous mixture of liquid and gaseous reactant feed bubbles or, depending upon the thermodynamic and flow conditions, the preferable flow condition; namely, having a separated flow in the tubes in which a thin layer of liquid is spread out over the inner surface of tubes 24 by the movement of gas and vapor in a centrally disposed pluglike flow.

No attempt is made to illustrate a realistic set of the naturally-occurring flow regimes in the tubes 24 in FIG. 2, since all that is needed in carrying out the process is to achieve a preponderance of the desired flow regime.

In the event the mixed feed evaporator of FIG. 2 were to be horizontally disposed, structure will be needed to avoid separation of the gas and liquid phases by the gravity-induced settling of the liquid. Also, the evaporating process streams could be made to flow vertically downward.

Figure 3:
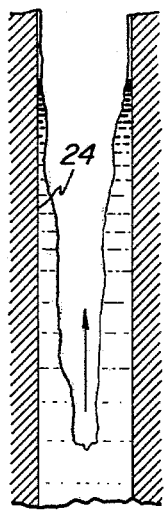
FIG. 3 is an enlarged view showing the preferred flow conditions for carrying out the evaporation step.

The enlarged view shown in FIG. 3 illustrates the preferred flow condition in which the liquid is spread out in a thin layer over much of the inner surface of each tube 24 by the movement of the centrally disposed gas and vapor at a velocity and quantity of gas flow preselected to establish this condition. The particular flow conditions to be utilized with any given mixed feed evaporator construction can be readily determined by routine experimentation. A variety of flow regimes (i.e. annular flow) and the conditions for establishing these regimes are described in the text "One-dimensional Two-phase Flow" by G. B. Wallis [McGraw-Hill, Inc. pp. 8, 9 316, 1st Edition (1969)] (incorporated by reference).

As in any heat exchange process for transferring heat to a fluid, the flow regime to be established in tubes 24 should also provide good thermal contact with the wall.

A prime application for the process of this invention is considered to lie in thermal energy transmission storage via chemical heat pipes. In a typical such system, methane reforming is conducted at a heat source, such as a nuclear reactor, at temperatures typically in the range of about 800°-900° C. to form a mixture of carbon monoxide and hydrogen. This mixture of gases is cooled by heat exchange with incoming reactants for the methane reforming step and is then pumped through a first pipeline at ambient temperature to a distant energy use area. At the energy use end of the first pipeline the gas mixture is heated to about 300°-500° C. in the presence of steam and a catalyst to carry out the methanation step. The resulting methane is returned to the heat source end via a second pipeline for repetition of the essentially closed loop process.

As now described in the literature (i.e. the Kugeler et al article) the feed streams of gaseous reactant and steam are mixed. The thermodynamic penalty for the resulting irreversible entropy of mixing can be eliminated by the practice of the instant invention.

When the gaseous reactant feed is mixed with water and is gradually heated as it proceeds through the mixed feed evaporator, water vapor is generated and the amount of water vapor in the gas stream at any given station corresponds roughly to the equilibrium vapor pressure at the prevailing temperature at that particular station.

Figure 5:
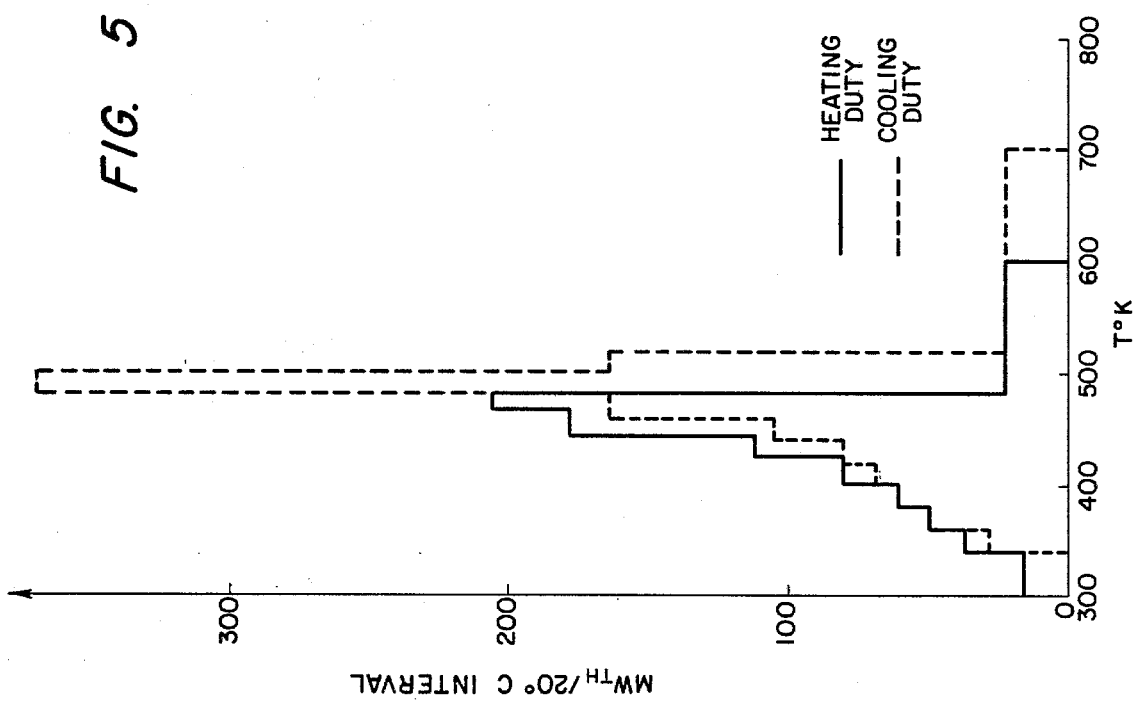
FIG. 4 is a temperature histogram displaying the heating and cooling duties in a methanator in which a separate boiler is employed to provide steam for the methanation reaction and FIG. 5 is a second temperature histogram showing the heating and cooling duties, when mixed feed evaporation according to this invention is employed.
Figure 4:
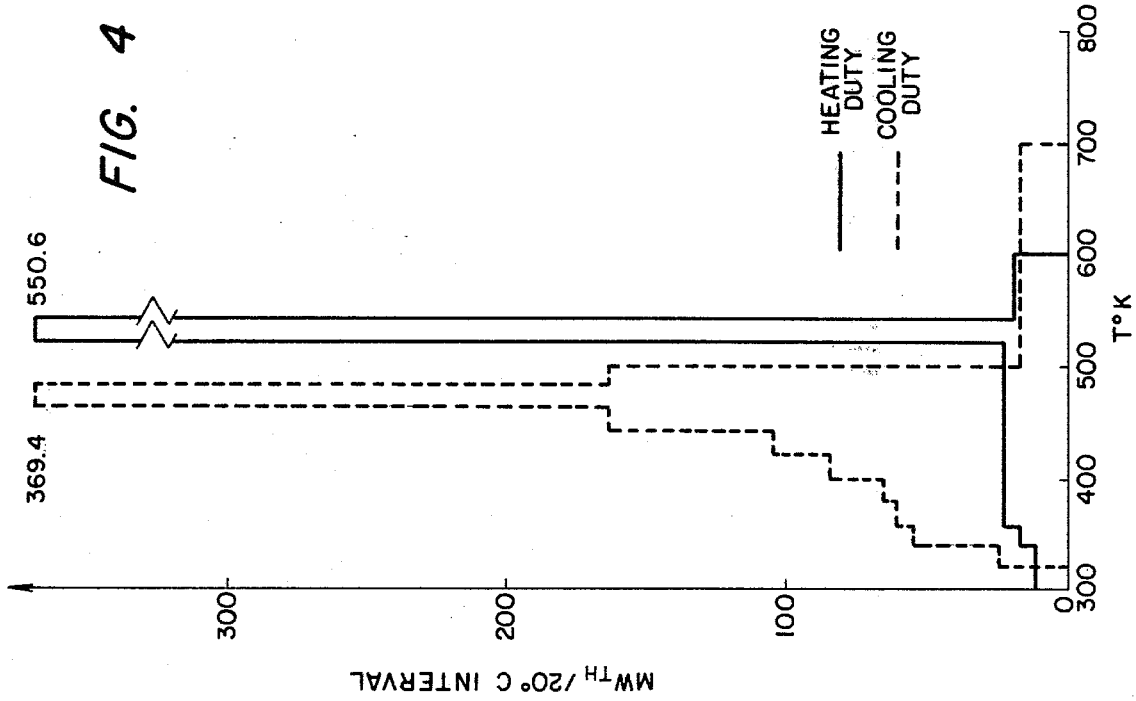

The advantage of employing mixed feed evaporation is shown by comparing the temperature histograms in FIGS. 4 and 5. FIG. 4 displays the heating and cooling duties for the methanator at the energy use end of the pipeline, when the steam input is provided by evaporating water as a separate component and then mixing the resulting steam with the reactant gases (CO and $H_2$), which are themselves heated in a separate gas heater to the chemical reactor conditions. From the histogram, it is seen that at temperatures between about 520° and 540° K., 550.6 MW (for 1000 MW supplied to the reformer) of thermal energy is required to accomodate the separate evaporation of the water and the heating of the gas reactants. Further, it may be seen that the heating duty requires a higher temperature heating fluid than is made available in the methanator cooling duty to effect partial condensation of water in the effluent. This means that the thermal energy for the heating duty must come from some other source, thereby reducing the methanation process efficiency.

In contrast thereto, the temperature histogram shown in FIG. 5 with the same operating conditions for the methanator as in the case in FIG. 4, but employing mixed feed evaporation, the large spike in the heating duty shown in FIG. 4 has been eliminated. In addition, the heating and cooling duties are more equalized and the cooling duty is at a generally higher temperature than the heating duty indicating that the need for an auxiliary source of thermal energy will have been eliminated and the process efficiency is substantially improved.

Another process for use in a chemical heat pipe in which the instant invention may be applied is one in which hydrogen is employed as a gaseous reactant and the liquid consists of one or more hydrocarbons (e.g. benzene, cyclohexane or a mixture thereof).

The process of this invention is broadly applicable to those chemical systems in which a gaseous reactant feed is to undergo a subsequent chemical reaction requiring the presence of a vapor, such as steam. In addition to the heat transport processes described herein, the process of this invention is also of use in fixed bed coal gasification in which an oxidizing gas, such as air, enriched air or oxygen is reacted with steam and carbon to form a gaseous fuel.

BEST MODE CONTEMPLATED

The preferred arrangement for the conduct of this process is shown schematically in FIG. 2 utilizing the flow conditions to be established therein are shown in FIG. 3.

What I claim as new and desire to secure by Letters Patent of the United States is:

1. In the process in which (a) a preselected liquid is vaporized, (b) a gaseous reactant feed stream is heated, (c) the vapor so produced and the heated gaseous reactant feed are introduced into a reaction chamber for the conduct of a chemical reaction and (d) a reaction product stream is discharged from said reaction chamber, the improvement comprising the steps of:
    mixing the preselected liquid and the gaseous reactant feed stream in a given molar ratio, the gas phase being substantially insoluble in said liquid,
    intimately contacting the liquid and gaseous phases, heating the resulting mixture by heat exchange with a fluid separate from said mixture, said fluid entering the heat exchange relationship at a temperature below the boiling point of said liquid at the total pressure of said mixture whereby vapor is generated from said liquid and introducing the resulting mixed flow comprising heated gaseous reactant feed and vapor into said reaction chamber for conduct of said chemical reaction.

2. The improvement recited in claim 1 wherein the preselected liquid is water.

3. The improvement recited in claim 2 wherein the gaseous reactant feed comprises carbon monoxide and hydrogen and the chemical reaction is methanation.

4. The improvement recited in claim 2 wherein the gaseous reactant feed comprises methane and the chemical reaction is methane reforming.

5. The improvement recited in claim 2 wherein the gaseous reactant feed contains oxygen and the reaction chamber is a fixed bed coal gasifier.

6. The improvement recited in claim 1 wherein the liquid and gaseous phases are intimately contacted by producing a substantially homogeneous mixture.

7. The improvement recited in claim 1 wherein the liquid and gaseous phases are intimately contacted by distributing the liquid as a thin layer surrounding a core of gaseous reactant feed.

8. The improvement recited in claim 1 wherein the chemical reaction is conducted in the presence of a catalyst.

9. The improvement recited in claim 1 wherein the gaseous reactant feed is hydrogen and the preselected liquid is at least one hydrocarbon.

* * * * *